UNITED STATES PATENT OFFICE.

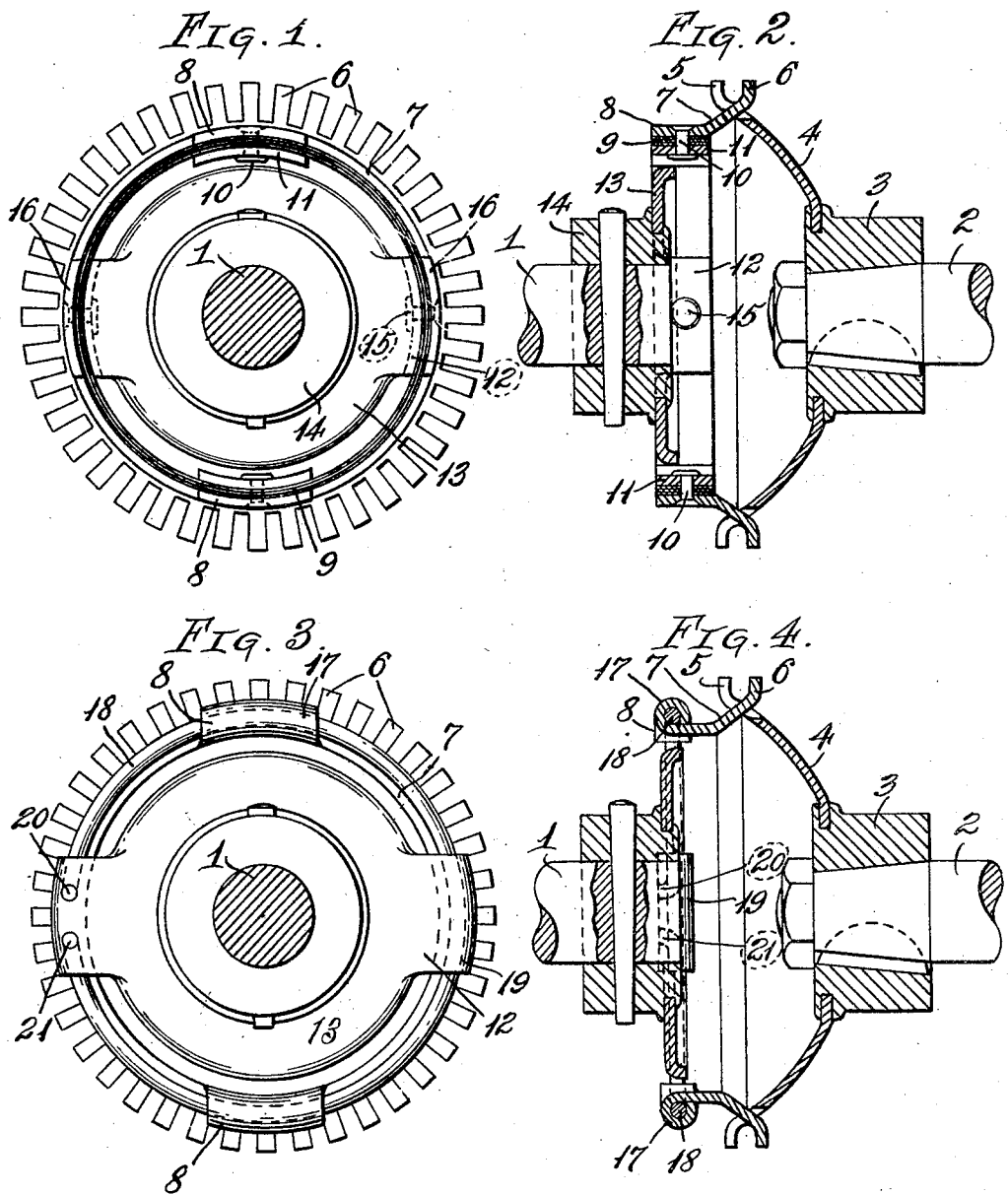

STEPHEN JENCICK, OF CLEVELAND, OHIO, ASSIGNOR TO G. A. SCHANZE, OF CLEVELAND, OHIO.

SHAFT-COUPLING.

1,325,247.      Specification of Letters Patent.      Patented Dec. 16, 1919.

Application filed March 2, 1917. Serial No. 152,049.

*To all whom it may concern:*

Be it known that I, STEPHEN JENCICK, a subject of the Emperor of Austria, residing at Cleveland, in the county of Cuyahoga and State of Ohio, have invented certain new and useful Improvements in Shaft-Couplings, of which the following is a specification.

This invention relates to a coupling for shaft sections and it is of a type such that the shaft sections may be not only out of axial alinement but may also be out of parallel alinement.

In couplings for magnetos and other driven devices it is frequently necessary to have the shaft sections out of axial alinement as well as out of parallel alinement. It is also necessary that such couplings should be noiseless and positive in their action. With the above features in view the present invention relates specifically to a coupling wherein the shaft sections may be out of alinement, either axial or parallel without affecting the drive through the coupling and without any undue lost motion in the parts.

The invention may be further briefly summarized as consisting in the construction and combination of parts hereinafter set forth in the following drawings, description and claims.

Referring to the drawings Figure 1 is a side view of the preferred form; Fig. 2 is a sectional view of the form shown in Fig. 1; Fig. 3 is a side view of a modified form and Fig. 4 is a sectional view of this form of the device.

In the embodiment shown in the drawings 1 and 2 are the shaft sections, which may be in absolute alinement or which may be slightly out of alinement in any direction. The shaft section 2 is provided with a hub 3 having a coupling member 4 secured thereto and provided around its periphery with a plurality of spaced teeth 5. These teeth mesh with similar teeth 6 formed on another coupling member 7. This coupling member is provided with a pair of diametrically disposed lugs 8. Within these two lugs is a spring 9 preferably a flat spring comprising several convolutions secured to the lugs 8 by means of rivets 10 passing through backing plates 11 on the inside of the spring. Within the spring and at 90° to the lugs 8 are lugs 12 projecting from a web 13 secured to the hub 14 keyed in any suitable manner to the shaft section 1. The lugs 12 are secured to the spring 9 in a manner similar to that in which the lugs 8 are secured to it, namely by means of rivets 15 passing through the lugs and through the backing plates 16, which in this instance are on the outside of the spring. It will be seen from the foregoing that the teeth 5 and 6 will permit universal movement in one direction, that is when the shaft sections are out of axial alinement, and the spring will permit a universal movement or a yielding movement when the shaft sections are out of parallel alinement. In the modification shown in Figs. 3 and 4 lugs 8 of the coupling member 7 are provided with eyes 17 clamped about a round wire spring 18. This wire spring 18 also passes through suitable eyes 19 formed in the lugs 12 of the other coupling member. One of the lugs, however, is provided with openings for receiving the two bent ends 20 and 21 of the round wire spring.

This type of coupling is adapted for use in a manner similar to the other type.

Having described my invention I claim:—

1. The combination with two shaft sections, of a coupling device therefor comprising a coupling member having spaced teeth, another coupling member having spaced teeth meshing with the spaced teeth of the first mentioned coupling member, a web for the second mentioned coupling member, a yielding device, connections between the yielding device and the second mentioned coupling member, and connections between the web and the yielding device and arranged intermediate the connections of the second mentioned coupling member with the yielding device.

2. The combination with a pair of shaft sections, of a coupling device comprising a coupling web secured to one of said sections and having spaced lugs projecting therefrom, a spring secured to said spaced lugs, a coupling member provided with lugs secured to the spring intermediate the lugs secured to the coupling web, and a second coupling member secured to the other shaft section, said coupling members having interlocking teeth.

3. The combination with a pair of shaft sections, of a coupling device therefor, comprising a coupling web having spaced lugs, a flat spring structure secured to said lugs and comprising several nested convolutions forming a laminated spring device, a coupling member having lugs secured to the spring device intermediate the lugs of the coupling web, and a second coupling member connected to the first mentioned coupling member.

4. The combination with a pair of shaft sections, of a coupling device therefor, comprising a coupling web having spaced lugs, a flat spring structure secured to said lugs and comprising several nested convolutions forming a laminated spring device, and a coupling member having lugs secured to the spring device intermediate the lugs of the coupling web.

5. The combination with a pair of shaft sections, of a coupling device therefor, comprising a coupling web having spaced lugs, a flat spring structure secured to said lugs and comprising several nested convolutions forming a laminated spring device, an intermediate coupling member having lugs secured to the spring device intermediate the lugs of the coupling web, said coupling member having peripheral teeth and another coupling member having teeth meshing with the teeth of the intermediate member.

In testimony whereof I affix my signature.

STEPHEN JENCICK.